(12) United States Patent
Takeshita et al.

(10) Patent No.: US 10,193,651 B2
(45) Date of Patent: Jan. 29, 2019

(54) OPTICAL NETWORK CONTROLLER AND OPTICAL NETWORK CONTROL METHOD

(71) Applicant: NEC Corporation, Minato-ku, Tokyo (JP)

(72) Inventors: Hitoshi Takeshita, Tokyo (JP); Shinsuke Fujisawa, Tokyo (JP); Ryuichi Ikematsu, Tokyo (JP); Akio Tajima, Tokyo (JP); Tomoyuki Hino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 5 days.

(21) Appl. No.: 15/117,245

(22) PCT Filed: Feb. 16, 2015

(86) PCT No.: PCT/JP2015/000699
§ 371 (c)(1),
(2) Date: Aug. 8, 2016

(87) PCT Pub. No.: WO2015/129194
PCT Pub. Date: Sep. 3, 2015

(65) Prior Publication Data
US 2016/0352452 A1 Dec. 1, 2016

(30) Foreign Application Priority Data
Feb. 25, 2014 (JP) .................................. 2014-034035

(51) Int. Cl.
*H04J 14/00* (2006.01)
*H04J 14/02* (2006.01)
(52) U.S. Cl.
CPC ...... *H04J 14/0263* (2013.01); *H04J 14/0267* (2013.01)

(58) Field of Classification Search
CPC ............... H04J 14/0263; H04J 14/0267; H04J 14/0227; H04J 14/0284; H04J 14/0257; H04J 14/0213; H04Q 11/0062
(Continued)

(56) References Cited

U.S. PATENT DOCUMENTS 8,526,828 B2   9/2013 Nakajima et al.
8,666,252 B2   3/2014 Nishihara et al.
(Continued)

FOREIGN PATENT DOCUMENTS

JP   2001-244956 A   9/2001
JP   2012-120010 A   6/2012
(Continued)

OTHER PUBLICATIONS

International Search Report for PCT Application No. PCT/JP2015/000699, dated Mar. 17, 2016.
(Continued)

*Primary Examiner* — M. R. Sedighian

(57) ABSTRACT

It is difficult to improve the wavelength-band utilization rate of an optical network as a whole while operating the optical network stably; and therefore, an optical network controller according to an exemplary aspect of the present invention includes optical wavelength region setting means for setting a wavelength region in an optical transmission line between a plurality of optical nodes composing an optical network using wavelength division multiplexing system dividing the wavelength region into consecutive regions of a first wavelength region and a second wavelength region; optical path setting means for setting a first optical path in the first wavelength region and a second optical path in the second wavelength region, the second optical path differing from the first optical path in a route; and control unit for instructing the plurality of optical nodes on a central wavelength and
(Continued)

a usable band of signal light for the optical node to transmit based on a setting by the optical path setting means.

17 Claims, 11 Drawing Sheets

(58) Field of Classification Search
USPC .................................................... 398/79, 57
See application file for complete search history.

(56) References Cited

U.S. PATENT DOCUMENTS

| | | |
|---|---|---|
| 8,964,581 B2 | 2/2015 | Takara et al. |
| 2005/0213875 A1* | 9/2005 | Sugitani ............... H04J 14/0294 385/16 |
| 2010/0028006 A1* | 2/2010 | Guy .................... H04J 14/0246 398/79 |
| 2012/0141130 A1 | 6/2012 | Nakajima et al. |
| 2012/0224851 A1* | 9/2012 | Takara ................ H04B 10/0793 398/45 |
| 2012/0237212 A1 | 9/2012 | Nishihara et al. |
| 2012/0301143 A1* | 11/2012 | Shimizu .............. H04J 14/0221 398/49 |
| 2013/0195460 A1* | 8/2013 | Kadohata ............ H04J 14/0257 398/79 |
| 2014/0294384 A1* | 10/2014 | Wakabayashi ...... H04J 14/0257 398/49 |

FOREIGN PATENT DOCUMENTS

| | | |
|---|---|---|
| JP | 2012-195787 A | 10/2012 |
| JP | 2013-243559 A | 12/2013 |
| JP | 2014-017651 A | 1/2014 |
| WO | 2004/084504 A1 | 9/2004 |
| WO | 2011/030897 A1 | 3/2011 |

OTHER PUBLICATIONS

English translation of Written opinion for PCT Application No. PCT/JP2015/000699.

* cited by examiner

OPTICAL NETWORK CONTROLLER AND OPTICAL NETWORK CONTROL METHOD

This application is a National Stage Entry of PCT/JP2015/000699 filed on Feb. 16, 2015, which claims priority from Japanese Patent Application 2014-034035 filed on Feb. 25, 2014, the contents of all of which are incorporated herein by reference, in their entirety.

TECHNICAL FIELD

The present invention relates to optical network controllers and optical network control methods, in particular, to an optical network controller and an optical network control method that are used for an optical network based on a wavelength division multiplexing system.

BACKGROUND ART

To handle the explosive expansion of information-communication traffic, it has been required lately and in the future to extend the capacity of the backbone optical communication network.

In optical networks, optical bandwidths are used in accordance with the dense wavelength division multiplexing (DWDM) system standardized by the Telecommunication Standardization Sector of the International Telecommunication Union (ITU-T). In the DWDM system, the entire available optical bandwidth is divided into narrow segments by a grid with constant width, called a wavelength grid, and optical signals in one wavelength channel are allocated within a grid spacing (ITU-T recommendation G.694.1). More specifically, the wavelength bandwidth of the optical communication (hereinafter referred to as a slot), the minimum unit of which has been 50 GHz till now, is divided into a narrow segment of 12.5 GHz. In addition, the number of wavelength slots to be allocated to each channel of the optical communication (optical path) is made variable, which makes it possible to keep the wavelength slots to be allocated to each optical path to the minimum necessary.

A new problem, however, has been caused with respect to wavelength band allocation. The problem will be described below. It is considered for example to allocate four wavelength slots to an optical path. If there are ten empty slots in the entire wavelength band of an optical fiber, and for details, two consecutive empty slots have been allocated to each of five optical bands discontinuously, the above-mentioned four wavelength slots in full width cannot be allocated to the optical path. That is to say, although there are a sufficient number of empty slots in total, consecutive empty slots cannot be ensured because each empty slot is composed of short segments. As a result, it is impossible to allocate to the optical path a wide wavelength band which allows high-capacity or long-haul communication. This is called a fragmentation of the wavelength band allocation (wavelength fragmentation), which becomes more likely to arise as the central wavelength of the optical path or the number of wavelength slots is changed repeatedly.

PTL 1 discloses an optical transmitter in which the wavelength multiplexing spacing of a transmission line (an optical fiber) is closed up by controlling the carrier frequency to solve the above-mentioned problem. The optical transmitter according to PTL 1 includes a laser light source, a signal processing circuit, a DAC (digital to analog converter), a driver, an optical modulator, and a carrier-wave frequency control circuit. Digital modulated signals output from the signal processing circuit are converted into analog modulated signals by the DAC, which are amplified by the driver. The signals are used for driving the optical modulator, which modulates the optical signal output from the laser light source. The carrier-wave frequency control circuit controls the frequency of the optical signal output from the optical modulator. This configuration enables the band utilization rate of the transmission line to improve.

PTL 2 discloses an optical network system in which segmentalized, that is, fragmented wavelength locations (wavelength slot) of the signal light are rearranged (defragmentation) so that the wavelength locations of signal light beams modulated by the same modulation scheme may lie next to each other. The optical network system according to PTL 2 includes a network controller, an optical transmitting and receiving device, an ROADM (Reconfigurable Optical Add-Drop Multiplexer) device, and an optical amplification unit. If the number of empty wavelength slots drops to below a certain value, the wavelength of the optical transmitting and receiving device is changed on the basis of the information on the empty wavelength slots in the network that is included in the network controller, and then the wavelength bandwidth of an optical amplifier of the ROADM device is expanded. Such wavelength defragmentation (rearrangement of wavelength) is repeated until signal light beams come to lie next to each other with respect to each modulation scheme. If the band used for the signal light is expanded, the signals modulated by the modulation scheme that is remarkably tolerant of the optical signal-to-noise ratio are preferentially moved to the expanded band. The configuration makes it possible to decrease the number of guard bands which prevent the interference between wavelength slots lying next to each other, and to improve the usage efficiency of the wavelength slot.

If failures occur in an optical transmission line, which is a route of optical communication in an optical network, it is necessary to restore the optical communication promptly; and therefore, an optical network system is operated that includes active optical fibers (active system optical paths) and standby optical fibers (standby optical paths) provided in the optical transmission line. The optical network system uses the active optical fibers in the normal optical communication, and the active optical fibers are promptly switched to the standby optical fiber when a communication breakdown occurs due to a failure of the active optical fiber. Some of the optical network systems are configured to use the standby optical fibers even in the normal operation. For example, PTL 3 discloses an optical transmission network in which signals for transmission having low priority are transmitted through the standby optical fibers in the normal operation. The optical transmission network according to PTL 3 includes a ring-like route in which a plurality of optical transceivers having the function for wavelength-division multiplexing are connected to each other by optical transmission devices. The optical transmission device is equipped with active optical fibers and standby optical fibers, and objects to be transmitted are prioritized. In the normal operation, main signals having high priority are transmitted through the active optical fibers, and sub-signals having low priority are transmitted through the standby optical fibers. During system failures, the sub-signal transmission is suspended, and the standby optical fiber propagates main signals. This makes it possible to transmit objects to be transmitted in the normal operation through the standby optical fibers different from the active optical fibers.

CITATION LIST

Patent Literature

[PTL 1] Japanese Unexamined Patent Application Publication No. 2012-120010
[PTL 2] Japanese Unexamined Patent Application Publication No. 2012-195787
[PTL 3] Japanese Unexamined Patent Application Publication No. 2001-244956

SUMMARY OF INVENTION

Technical Problem

However, in the frequency control by the optical transmitter as described in PTL 1, or in the wavelength defragmentation by the optical network system as described in PTL 2, the signal light is disrupted if the wavelength is changed to improve the optical utilization rates of the wavelength slots. That is to say, it has been difficult to transmit the signal light stably without instantaneous interruption. In the optical transmission network as described in PTL 3, the main signals are transmitted through the active optical fibers, and the sub-signals are transmitted through the standby optical fibers, to improve the optical utilization rates of the optical transmission devices in the normal operation. However, since the sub-signal transmission through the standby optical fiber is suspended during system failures, it is impossible to transmit the sub-signals. That is to say, it has been difficult to maintain the optical utilization rate of the optical transmission device.

As described above, there has been the problem that it is difficult to improve the wavelength-band utilization rate of an optical network as a whole while operating the optical network stably.

The object of the present invention is to provide an optical network controller and an optical network control method to solve the above-mentioned problem that it is difficult to improve the wavelength-band utilization rate of an optical network as a whole while operating the optical network stably.

Solution to Problem

An optical network controller according to an exemplary aspect of the present invention includes optical wavelength region setting means for setting a wavelength region in an optical transmission line between a plurality of optical nodes composing an optical network using wavelength division multiplexing system dividing the wavelength region into consecutive regions of a first wavelength region and a second wavelength region; optical path setting means for setting a first optical path in the first wavelength region and a second optical path in the second wavelength region, the second optical path differing from the first optical path in a route; and control means for instructing the plurality of optical nodes on a central wavelength and a usable band of signal light for the optical node to transmit based on a setting by the optical path setting means.

An optical network control method according to an exemplary aspect of the present invention includes setting a wavelength region in an optical transmission line between a plurality of optical nodes composing an optical network using wavelength division multiplexing system dividing the wavelength region into consecutive regions of a first wavelength region and a second wavelength region; and setting a first optical path in the first wavelength region and a second optical path in the second wavelength region, the second optical path differing from the first optical path in a route.

Advantageous Effects of Invention

According to the optical network controller and the optical network control method of the present invention, it becomes possible to improve the wavelength-band utilization rate of an optical network as a whole while operating the optical network stably.

DESCRIPTION OF EMBODIMENTS

Exemplary embodiments of the present invention will be described in detail below.

A First Exemplary Embodiment

Figure 1:
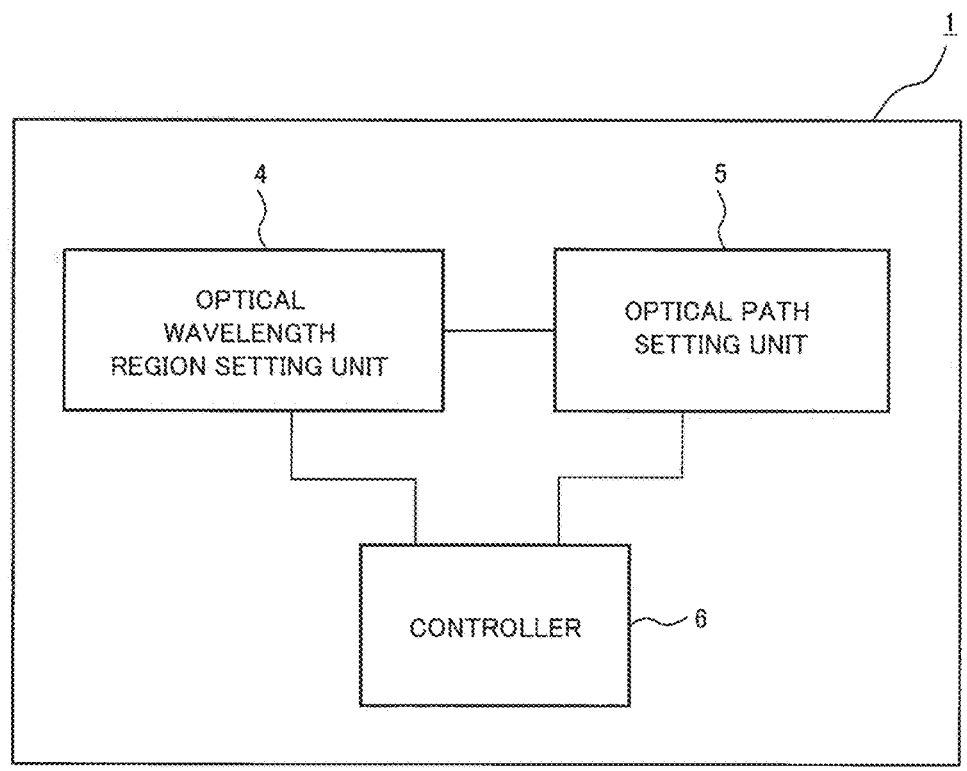
FIG. 1 is a block diagram illustrating a configuration of an optical network controller in accordance with a first exemplary embodiment of the present invention.

A first exemplary embodiment of the present invention will be described in detail with reference to the drawings. FIG. 1 is a block diagram illustrating a configuration of an optical network controller in accordance with the first exemplary embodiment of the present invention. The configuration of the optical network controller in accordance with the first exemplary embodiment of the present invention will be described with reference to FIG. 1.

An optical network controller 1 in accordance with the present invention controls the wavelengths in optical transmission lines between a plurality of optical nodes composing an optical network using wavelength division multiplexing system and includes an optical wavelength region setting unit 4, an optical path setting unit 5, and a controller 6.

The optical wavelength region setting unit 4 sets a wavelength region in an optical transmission line between a plurality of optical nodes composing an optical network dividing the wavelength region into two consecutive regions of a first wavelength region and a second wavelength region. The optical path setting unit 5 sets an active system optical path of a first optical path in the first wavelength region, and a standby system optical path of a second optical path in the second wavelength region. The active system optical path and the standby system optical path are routes that differ from each other. The controller 6 receives a demand for setting optical paths from a user, instructs the optical wavelength region setting unit 4 to set a wavelength region, and instructs the optical path setting unit 5 to set optical paths.

The optical path setting unit 5 also sets at least one wavelength slot within each of the first wavelength region and the second wavelength region. Additionally, the controller 6 transmits signals (instruction signals), to a plurality of optical nodes described below, to indicate a setting of the active system optical path with the first wavelength region and the standby system optical path with the second wavelength region, and wavelength slots set in each wavelength region. The instruction signal includes allocation information on the first wavelength region for the signal light used for the active system optical path, and allocation information on the second wavelength region for the signal light used for the standby system optical path. The allocation information on the wavelength slot means the central wavelength of the wavelength slots to be used and the number of the wavelength slots (wavelength bandwidth to be used). The first wavelength region and the second wavelength region include a plurality of wavelength slots that are located consecutively.

The controller 6 receives a state signal including the information on usage conditions of wavelength slots from an optical node described below. The state signal includes the information on in-use wavelength slots and monitoring information on unused wavelength slots in the first wavelength region for the active system optical path, and monitoring information on unused wavelength slots in the second wavelength region for the standby system optical path. The monitoring information on unused wavelength slots includes the physical availability or unavailability of optical paths at the time of disaster, and the information for monitoring optical fiber disconnection at the time of disaster, for example.

Figure 2:
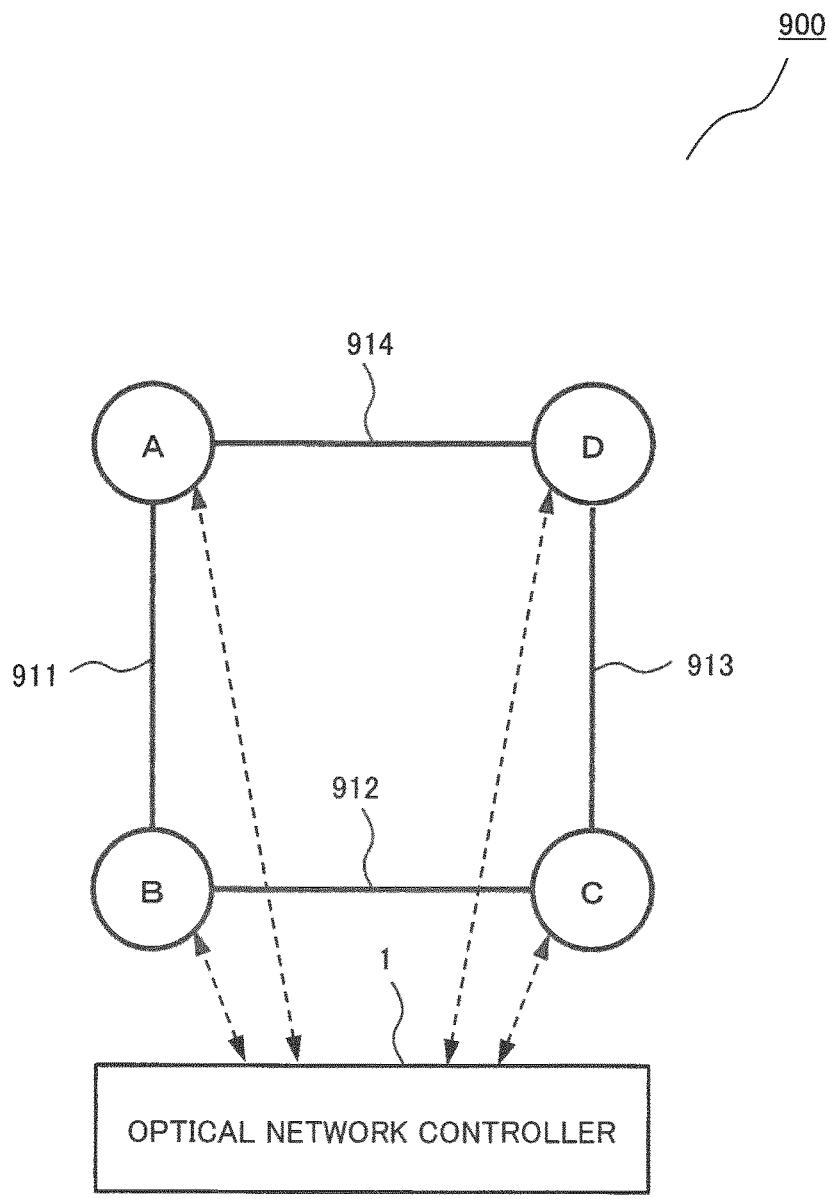
FIG. 2 is a schematic diagram illustrating an optical network including the optical network controller in accordance with the first exemplary embodiment of the present invention.
Figure 3:
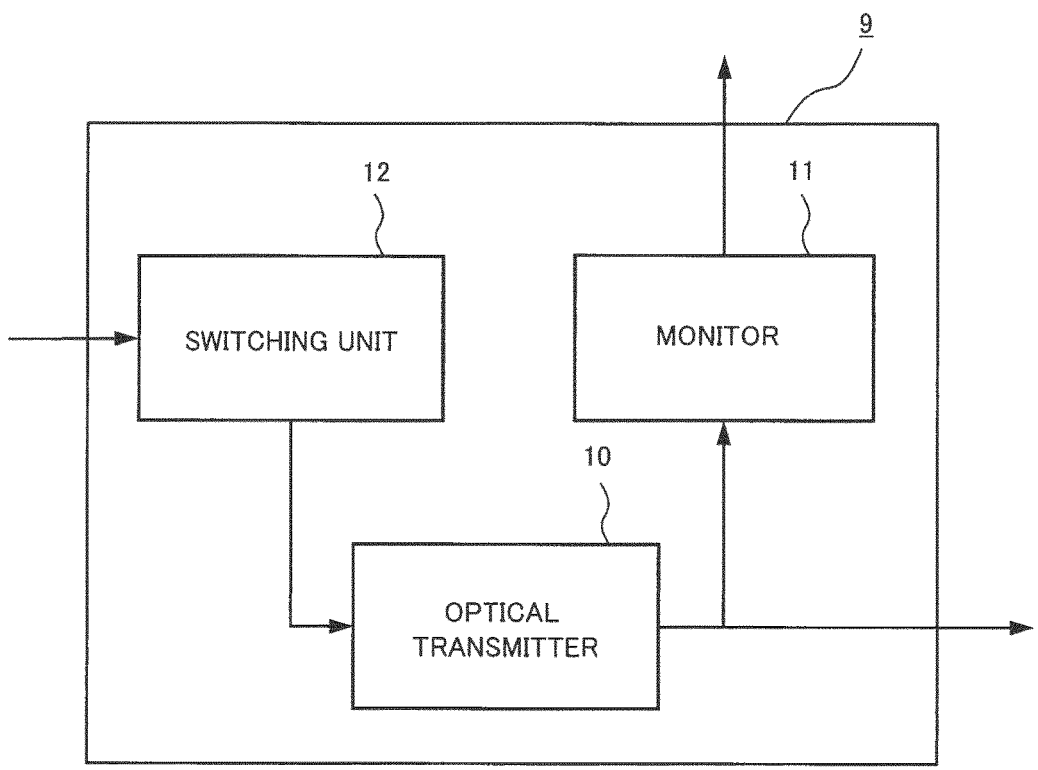
FIG. 3 is a block diagram illustrating a configuration of an optical node in accordance with the first exemplary embodiment of the present invention.
Figure 4:
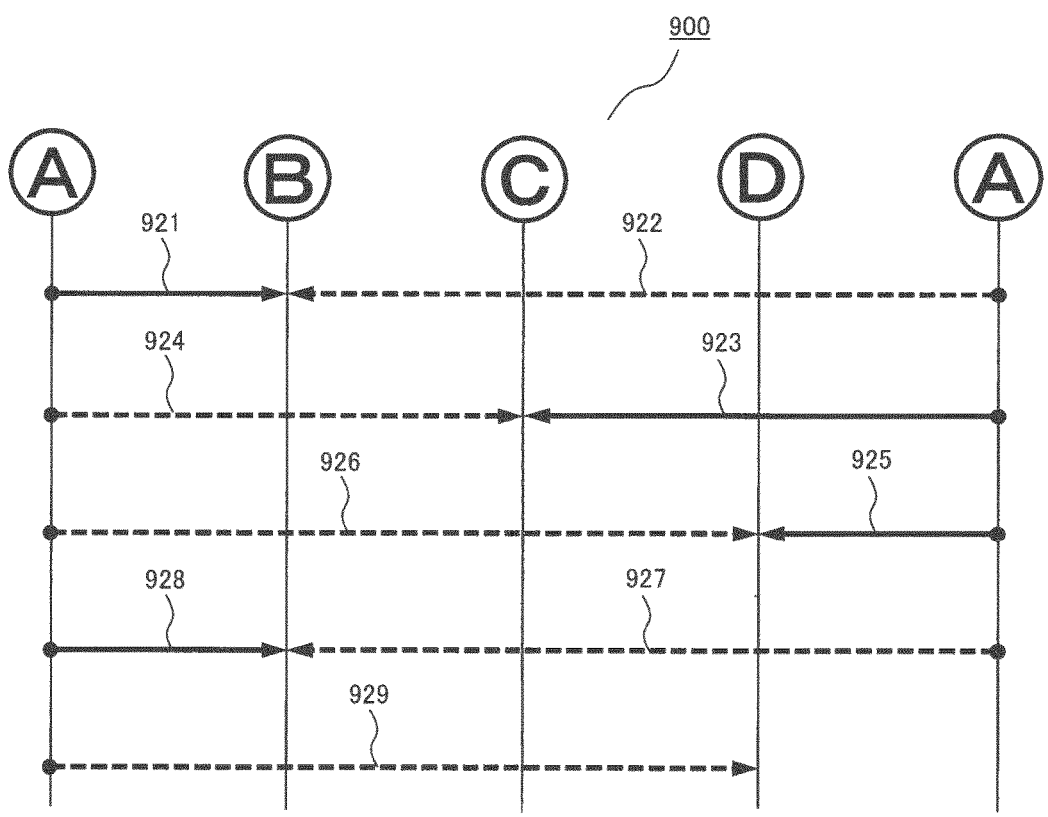
FIG. 4 is a diagram illustrating setting status of optical paths in an optical network including the optical nodes in accordance with the first exemplary embodiment of the present invention.

Next, the operations of an optical network as a whole and an optical node composing the optical network will be described. FIG. 2 is a schematic diagram illustrating an optical network including optical nodes in accordance with the first exemplary embodiment, and FIG. 3 is a block diagram illustrating a configuration of the optical node in accordance with the first exemplary embodiment of the present invention. FIG. 4 is a state diagram of the optical network including the optical nodes in accordance with the first exemplary embodiment, and illustrates setting status of optical paths between the optical nodes at a certain moment.

Referring to FIG. 2, an optical node ring network 900 in which four optical nodes are circularly connected to each other is simulated as an intended optical network. The optical node ring network 900 includes four optical nodes connected to each other by optical fibers, and is configured as a ring topology. More specifically, the optical node A and the optical node B are connected to each other by means of an optical fiber 911, and the optical node B and the optical node C are connected to each other by means of an optical fiber 912. The optical node C and the optical node D are connected to each other by means of an optical fiber 913, and the optical node D and the optical node A are connected to each other by means of an optical fiber 914. The above-mentioned connection makes the optical node ring network 900 a network connecting optical nodes in a ring topology. The optical node ring network 900 is merely an example and is not limited to a ring topology. The optical node ring network 900 may use a mesh topology, a star topology (star or wheel), fully-connected, a bus topology, or a tree topology, or a topology with combination of them. The number of the optical nodes may be smaller or larger than four. Each of four optical nodes A to D is connected to the optical network controller 1 so as to transmit and receive control signals, and the optical network controller 1 transmits the instruction signals to the optical nodes A to D. In addition, the optical nodes A to D transmit the signals to the optical network controller 1.

Referring to FIG. 3, the optical node 9 includes an optical transmitter 10, a monitor 11, and a switching unit 12. The optical transmitter 10 includes a transmission unit corresponding to each of a plurality of wavelength slots. The transmission unit converts the information to be transmitted into an optical signal and sends an optical signal in a wavelength slot varying by the transmission unit to a communication channel of the optical fiber. The monitor 11 includes a plurality of receiving units, which detect a part of the optical signals output from the optical transmitter 10. This enables the monitor 11 to monitor the in-use wavelength slots. The monitor 11 may include separate light-receiving units with respect to each wavelength slot, or a light-receiving unit which collectively detects a plurality of wavelength slots. The monitor 11 outputs the state signal including the monitoring information on the wavelength slot to the optical network controller 1. The switching unit 12 receives input of the instruction signal from the optical network controller 1, allocates the first wavelength region and the second wavelength region based on the instruction signal, allocates a first optical path and a second optical path in each wavelength region, and sets wavelength slots. The instruction signals from the optical network controller 1 to a plurality of optical nodes include the information about adding or removing an active system optical path or a standby system optical path.

Referring to FIG. 4, an active system optical path 921 is set from the optical node A to the optical node B (a solid line in the figure). As a backup in case of failure in the active system optical path 921, a standby system optical path 922 is set from the optical node A to the optical node B through the optical nodes D and C (a dotted line in the figure). An active system optical path 923 is also set from the optical node A to the optical node C through the optical node D (a solid line in the figure). As a backup in case of failure in the active system optical path 923, a standby system optical path 924 is set from the optical node A to the optical node C through the optical node B (a dotted line in the figure). The same applies to active system optical paths 925 and 928 and standby system optical paths 926 and 927 corresponding to them respectively.

Figure 5A:
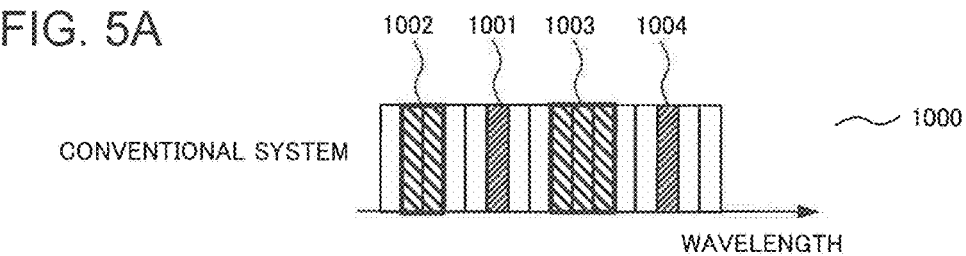
FIG. 5A is a conceptual diagram illustrating a conventional wavelength slot allocation system for explaining processing operations of the optical network controller in accordance with the first exemplary embodiment of the present invention.
Figure 5B:
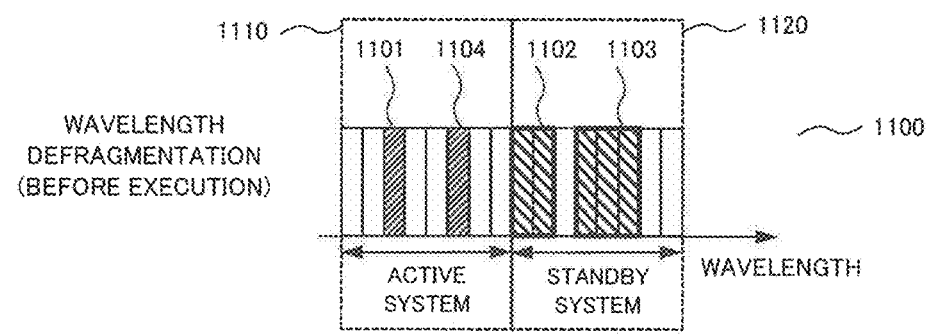
FIG. 5B is a conceptual diagram for explaining processing operations of the optical network controller in accordance with the first exemplary embodiment of the present invention before performing wavelength defragmentation.
Figure 5C:
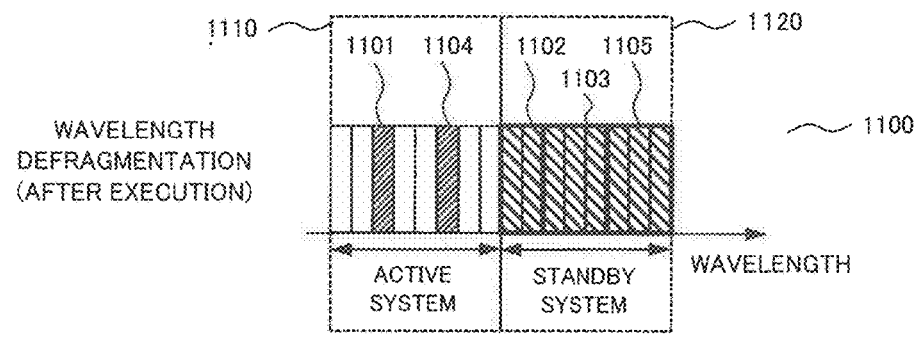
FIG. 5C is a conceptual diagram for explaining processing operations of the optical network controller in accordance with the first exemplary embodiment of the present invention after performing wavelength defragmentation.

Next, the operation of the wavelength defragmentation (wavelength rearrangement) in the optical network controller according to the first exemplary embodiment will be described with reference to FIG. 5A, FIG. 5B, and FIG. 5C. FIG. 5A, FIG. 5B, and FIG. 5C are conceptual diagrams for explaining processing operations concerning the rearrangement of wavelength regions and wavelength slots in the optical network controller according to the first exemplary embodiment of the present invention, and illustrate wavelength slots allocated to optical fibers to connect optical nodes to each other. FIG. 5A illustrates a conventional wavelength slot allocation.

In FIG. 5C. FIG. 5A, FIG. 5B, the horizontal axis represents the wavelength, and one rectangular frame represents one wavelength slot. If a wavelength slot in the figures is painted white, it indicates that the wavelength slot is not allocated. If a wavelength slot in the figures is hatched, it indicates that the wavelength slot is allocated. For example, a wavelength slot 1001 in FIG. 5A indicates that one wavelength slot is used, and a wavelength slot 1002 indicates that two wavelength slots are used. The wavelength slots 1001 and 1004 in FIG. 5A are applied to the active system optical path, and the wavelength slots 1002 and 1003 are applied to the standby system optical path.

Here, it is simulated that the active system optical paths and the standby system optical paths are allocated as illustrated in FIG. 4 to the optical fibers 911 to 914 illustrated in FIG. 2, and the optical path passing through the optical node A includes a plurality of wavelength slots. Additionally, a second standby system optical path 929 is newly set in addition to the standby system optical path 926 for the active system optical path 925. The information on setting the second standby system optical path 929 is included in the above-mentioned allocation signal, and based on the signal, the optical path setting unit 5 in the optical network controller 1 allocates wavelength slots to the wavelength region for the standby system optical path.

If wavelength slots are allocated to the optical path in the optical fiber 911 in the conventional system, the operation is as follows. In a wavelength slot allocation 1000 to optical paths passing through the optical node A, the wavelength slot 1001 is a wavelength slot allocated to the active system optical path 921 in FIG. 4, and the wavelength slot 1002 is a wavelength slot allocated to the standby system optical path 922. As mentioned above, expressing the correspondence relationship between the optical paths in FIG. 4 and the wavelength slots in FIG. 5A as (wavelength slot, optical path, number of slots), the wavelength slot 1001 and the active system optical path 921 can be expressed as (1001, 921, 1). Similarly, the correspondence relationships between FIG. 4 including the other wavelength slots and FIG. 5A are expressed as (1001, 921, 1), (1002, 924, 2), (1003, 926, 3), and (1004, 928, 1), which are in the optical fiber 911. In the conventional wavelength slot allocation as described above, wavelength slots used for the active system are mixed with those used for the standby system in all wavelength regions.

Trying to add a standby system optical path 929 newly, although there are more than three unallocated wavelength slots (hereinafter, referred to as empty wavelength slots) in the wavelength slot allocation 1000, three consecutive empty wavelength slots cannot be ensured. In contrast, three consecutive empty wavelength slots can be prepared by wavelength defragmentation, that is, by shifting the wavelength slot 1003 toward either the wavelength slot 1001 side or the wavelength slot 1004 side. However, this makes the wavelength slot 1001 or 1004 applied to the active system optical path neighbor the wavelength slot 1003 applied to the standby system optical path without a guard band. As a result, the interference between adjacent wavelength slots arises, which brings about the possibility of transmission signal deterioration. This makes it difficult to relocate the wavelength slot 1003 so as to ensure three consecutive empty wavelength slots.

On the other hand, in the first exemplary embodiment, as illustrated in FIG. 5B, wavelength slots are allocated to optical paths passing through the optical node A as illustrated by wavelength slot allocation 1100. That is to say, contrary to the wavelength slot allocation 1000, in the wavelength slot allocation 1100, a wavelength region 1110 for the active system optical path and a wavelength region 1120 for the standby system optical path are divided into consecutive wavelength blocks in advance. More specifically, a wavelength slot 1101 is allocated to the active system optical path 921 in FIG. 4, and a wavelength slot 1102 is allocated to the standby system optical path 924. Thus, expressing correspondence relationships between the optical paths in FIG. 4 and the wavelength slots in FIG. 5B, (1101, 921, 1), (1102, 924, 2), (1103, 926, 3), and (1104, 928, 1) are allocated to the optical fiber 911. That is to say, wavelength slots for the active system optical path are allocated to the wavelength region 1110, and wavelength slots for the standby system optical path are allocated to the wavelength region 1120.

The above-mentioned central wavelength of the wavelength slots and the wavelength regions to be used are associated with FIG. 5B as follows. In the wavelength slot 1103 illustrated in FIG. 5B, the central wavelength of the wavelength slot located at the center corresponds to the above-mentioned central wavelength, and the value, obtained by multiplying the number of wavelength slots, that is, "3" by the bandwidth of each wavelength slot, corresponds to the wavelength band to be used. In the wavelength slot 1102 illustrated in FIG. 5B, the border between those two wavelength slots corresponds to the above-mentioned central wavelength, for example, and the value, obtained by multiplying the number of wavelength slots, that is, "2" by the bandwidth of each wavelength slot, corresponds to the wavelength band to be used. In the wavelength slots 1101 and 1104 illustrated in FIG. 5B, since there is only one wavelength slot, the central wavelength of the wavelength slot corresponds to the above-mentioned central wavelength, and the value, obtained by multiplying the number of wavelength slots, that is, "1" by the bandwidth of each wavelength slot, corresponds to the wavelength band to be used.

Intending to add a standby system optical path 929 newly, the switching unit 12 included in the optical node 9 selectively performs wavelength defragmentation on the wavelength region 1120 only based on an instruction signal from the controller 6, as illustrated in FIG. 5C. That is to say, by shifting the wavelength slot 1103 toward shorter wavelengths (the left side in the figure) in the wavelength region 1120, three consecutive empty wavelength slots are formed on the long-wavelength side (the right side in the figure) of the wavelength slot 1103, and then a wavelength slot 1105 having three wavelength slots is disposed in the empty wavelength slots. The wavelength slot 1105 is allocated to the standby system optical path 929. In order to rearrange the wavelength slots 1102, 1103, and 1105 in this way, the optical network controller transmits an instruction signal to the optical node A. No wavelength slot is added to or changed into the active system optical path.

Figure 6:
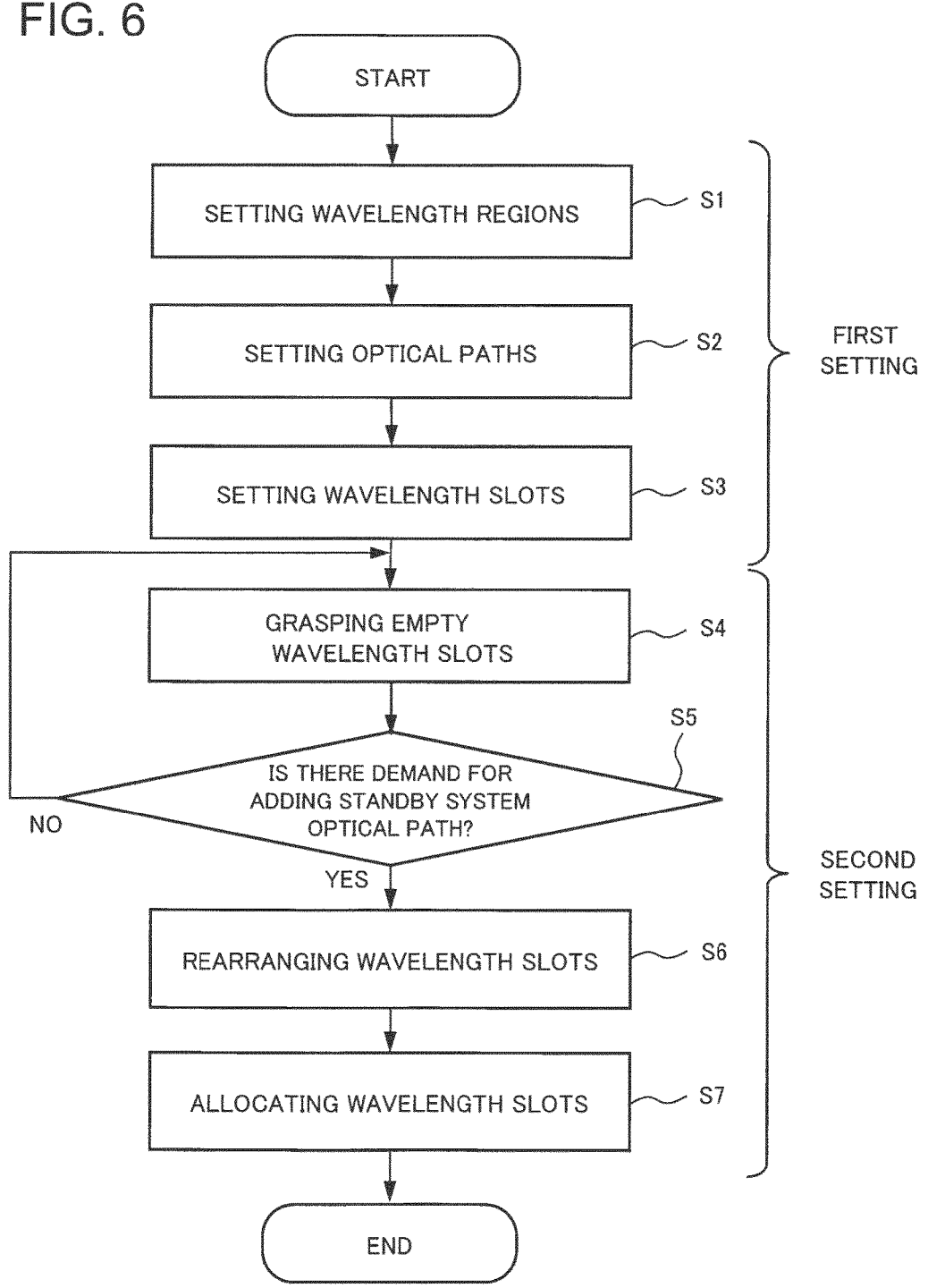
FIG. 6 is a flowchart for explaining processing operations of the optical network controller in accordance with the first exemplary embodiment of the present invention.

Next, processing operations of the optical network controller in accordance with the first exemplary embodiment will be described, and the processing operations are concerned with the setting and rearrangement of optical paths, wavelength regions, and wavelength slots. FIG. 6 is a flowchart illustrating the processing operation of the optical network controller in accordance with the first exemplary embodiment of the present invention, and more particularly, a flowchart concerning the processing for setting an optical path, a wavelength region to be used, and wavelength slots within the wavelength region.

Referring to FIG. 6, in response to a demand for setting optical paths from a user, and more specifically, a demand for setting a prescribed active system optical path and a standby system optical path corresponding to that, the optical network controller 1 sets wavelength regions and optical paths. More specifically, the optical wavelength region setting unit 4 sets a first wavelength region for the active system optical path and a second wavelength region for the standby system optical path based on a signal with respect to the above-described demand for setting optical paths (step S1). The optical path setting unit 5 sets a first optical path for the active system optical path and a second optical path for the standby system optical path based on the above-mentioned signal (step S2). Additionally, the optical network controller 1 sets wavelength slots within the first wavelength region and the second wavelength region (step S3). The number of wavelength slots is determined with respect to each optical path. If a plurality of wavelength slots are set corresponding to the optical path, the wavelength slot in a central location and the number of wavelength slots are set. The above-mentioned steps compose a first setting of the optical network controller.

Following the first setting, the optical network controller carries on a second setting. The optical network controller 1 receives input of the state signal from the optical node and grasps the usage conditions of the wavelength slots (step S4). More specifically, there are three empty wavelength slots in the wavelength region 1120 illustrated in FIG. 5B, that is, one empty wavelength slot is located between the wavelength slot 1102 and the wavelength slot 1103, and two empty wavelength slots are located on the long-wavelength side (the right side in the figure) of the wavelength slot 1103.

Subsequently, the optical network controller 1 monitors a demand for adding a standby system optical path from a user (step S5). If there is no demand for adding a standby system optical path (step S5/NO), the optical network controller 1, returning to step S4, carries on grasping empty wavelength slots and monitoring demand for adding a standby system optical path. On the other hand, if there is a demand for adding a standby system optical path (step S5/YES), the optical network controller 1 performs the wavelength defragmentation (rearrangement) of the wavelength slots. More specifically, the optical path setting unit 5 determines that the number of empty wavelength slots in the wavelength region 1120 is larger than that of wavelength slots in the standby system optical path 929. The optical path setting unit 5 then shifts the wavelength slot 1103 in use toward shorter wavelengths. Subsequently, the optical path setting unit 5 allocates wavelength slots to be applied to a second standby system optical path to the wavelength region 1120 (step S7). That is to say, the wavelength slot 1105 for the second standby system optical path is allocated to empty wavelength slots that have been formed on the long-wavelength side of the wavelength region 1120 in step S6.

In the processing operation during the second setting, the process is returned to step S4 when it is determined to be No in step S5, but the process is not limited to this. The process may be returned to a position prior to step S5. Step S4 and step S5 may be performed in reverse order. In addition, the controller 6 transmits to the optical node A an instruction signal including the information on the setting of optical paths and wavelength regions, and the rearrangement of wavelength slots, every time the first setting and the second setting are performed.

As described above, a wavelength region for the standby system optical path is selected, and the wavelength defragmentation for the wavelength region is performed. This makes it possible to improve the wavelength-band utilization rate of the block allocated to the standby system optical path while operating the optical network stably, that is, without interruption in communication services by the active system optical path in the normal operation. Since no standby system optical path is used in the normal operation, the wavelength defragmentation can be performed at low speed. That is to say, a slow-speed control circuit can be applied to the wavelength defragmentation, which can make the entire circuit less costly.

The standby system optical path 929 serves as a backup when a double failure arises in the active system optical path 925. If the standby system optical path 929 is set as a second standby system optical path for the active system optical path 925, and the wavelength slot 1105 is applied to the standby system optical path 929, the tolerance for the failure of the active system optical path 925 can be doubled. This makes it possible to improve the reliability of the optical network as a whole. Although it is described as an example above that the controller 6 transmits the instruction signal to the optical node A, the controller 6 also transmits similar setting and instruction signals to the other optical nodes.

A Second Exemplary Embodiment

Figure 7:
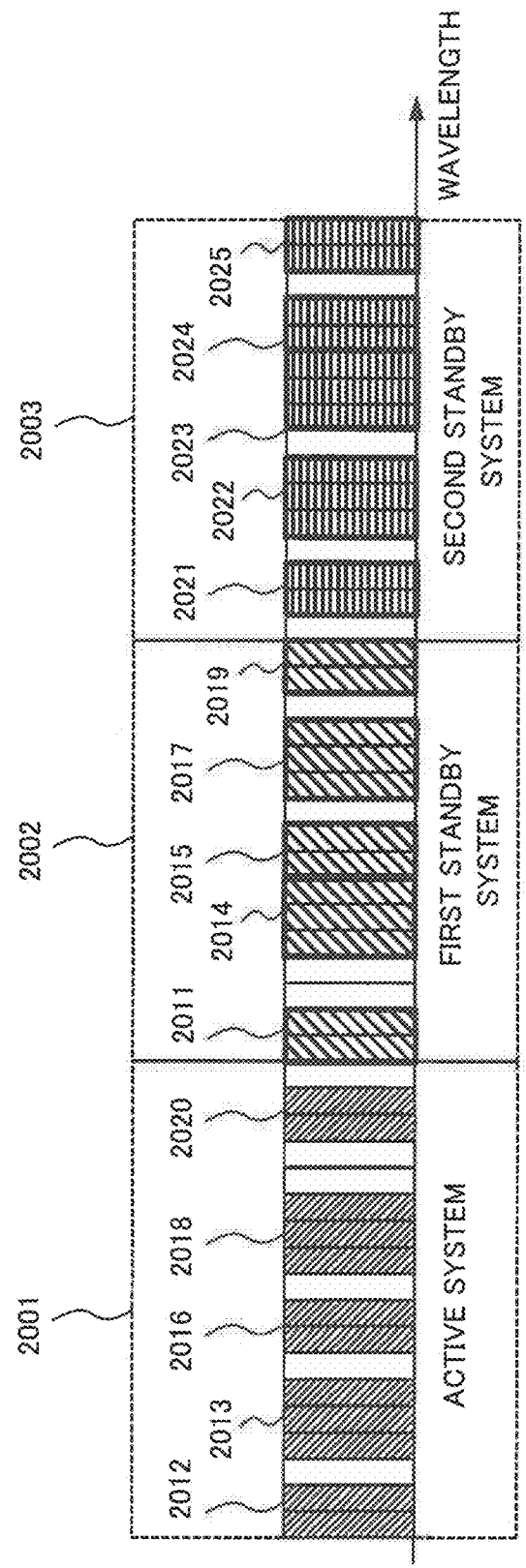
FIG. 7 is a conceptual diagram for explaining setting status of processing operations of an optical network controller in accordance with a second exemplary embodiment of the present invention.
Figure 8:
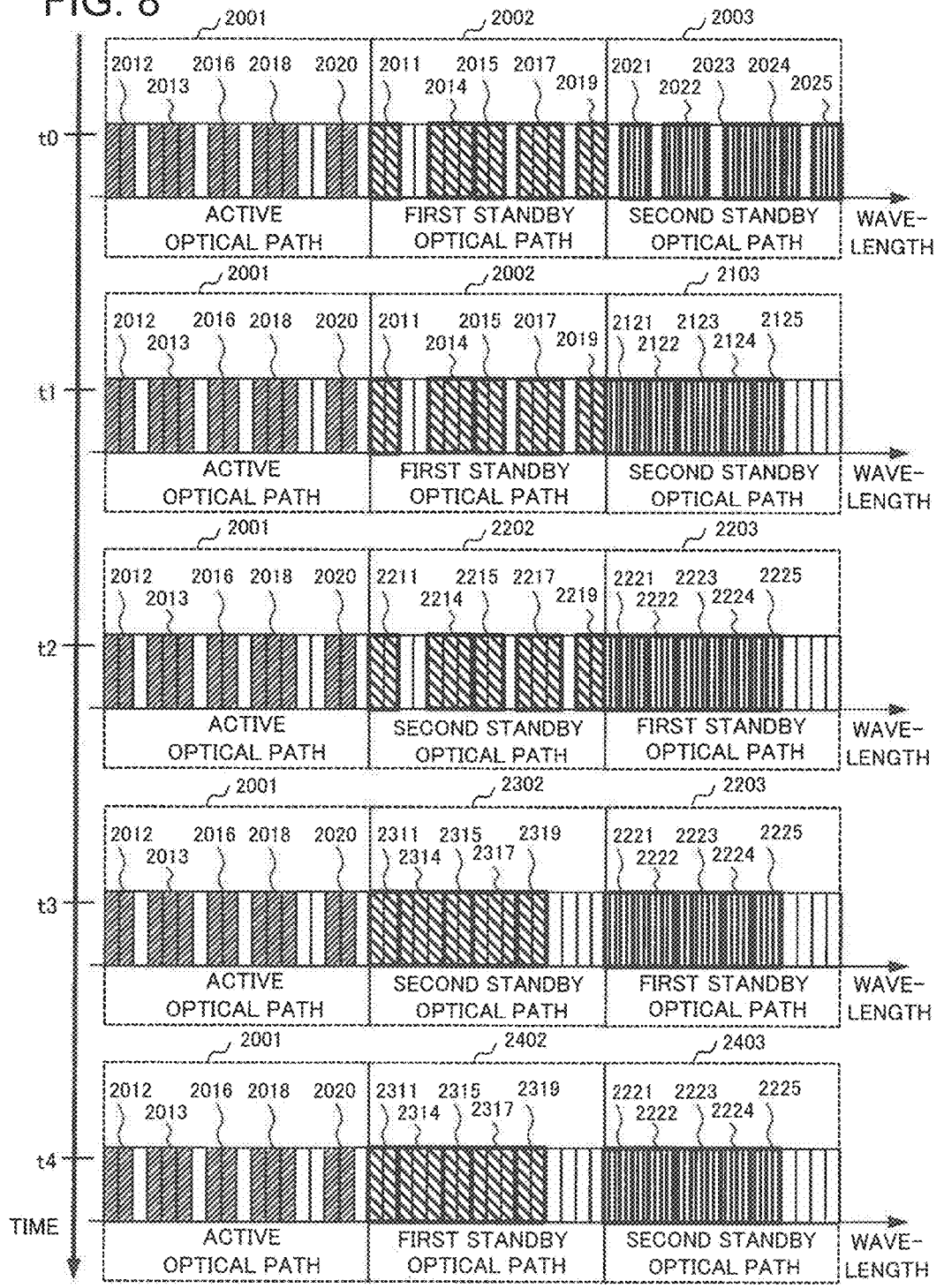
FIG. 8 is a conceptual diagram for explaining processing operations over time of the optical network controller in accordance with the second exemplary embodiment of the present invention.

Next, a second exemplary embodiment of the present invention will be described in detail. An optical network controller in the second exemplary embodiment has the same configuration as that in the first exemplary embodiment and has a different processing operation of the wavelength defragmentation for a selected wavelength region. FIG. 7 is a conceptual diagram for explaining setting status of processing operations of the optical network controller according to the second exemplary embodiment of the present invention, and FIG. 8 is a conceptual diagram for explaining the processing operations over time of the optical network controller according to the second exemplary embodiment of the present invention. As is the case with the first exemplary embodiment, the optical network controller and the optical node are assumed to be configured as illustrated in FIG. 2 and FIG. 3. With reference to FIGS. 2, 3, 7, and 8, the processing operation of the optical network controller according to the second exemplary embodiment of the present invention will be described below.

Referring to FIG. 7, according to the second exemplary embodiment of the present invention, the optical wavelength region setting unit 4 sets wavelength regions dividing the wavelength region into three consecutive blocks of wavelength regions 2001, 2002, and 2003. The optical path setting unit 5 sets an active system optical path in the wavelength region 2001, a first standby system optical path in the wavelength region 2002, and a second standby system optical path in the wavelength region 2003. More specifically, the optical path setting unit 5 sets wavelength slots 2012, 2013, 2016, 2018, and 2020 in the wavelength region 2001 for an active system optical path. The active system optical path provides communication services.

The optical path setting unit 5 sets wavelength slots 2011, 2014, 2015, 2017, and 2019 in the wavelength region 2002 for a first standby system optical path. The first standby system optical path provides communication services in place of the active system optical path when a failure arises in the active system optical path. The optical path setting unit 5 sets wavelength slots 2021, 2022, 2023, 2024, and 2025 in the wavelength region 2003 for a second standby system optical path. The second standby system optical path is set as a backup that is used on the occurrence of failures in the first standby system optical path. That is to say, when failures occur in the active system optical path and the first standby system optical path (double failure), the second standby system optical path is used for providing communication services.

The optical path setting unit 5 sets wavelength slots in each wavelength region as follows. In the wavelength region 2001, the wavelength slots 2012, 2016, and 2020 having two wavelength slots respectively are discontinuously arranged from shorter wavelength (the left side in the figure). The wavelength slot 2013 having three wavelength slots is interposed between the wavelength slots 2012 and 2016, and the wavelength slot 2018 having three wavelength slots is interposed between the wavelength slots 2016 and 2020. One or two empty wavelength slots are disposed between individual wavelength slots.

On the other hand, in the wavelength region 2002, there are from the short wavelength side, the wavelength slot 2011 having two wavelength slots, the wavelength slot 2014 having three wavelength slots sandwiching two empty wavelength slots on the right side of the figure, and the wavelength slot 2015 having two wavelength slots consecutively arranged. Subsequently, one empty wavelength slot, the wavelength slot 2017 having three wavelength slots, one empty wavelength slot, and the wavelength slot 2019 having two wavelength slots are consecutively arranged.

In the wavelength region 2003, the wavelength slot 2021 having two wavelength slots, and the wavelength slot 2022 having three wavelength slots sandwiching one empty wavelength slot on the right side of the figure are consecutively arranged from the short wavelength side. Subsequently, one empty wavelength slot, the wavelength slot 2023 having three wavelength slots, the wavelength slot 2024 having two wavelength slots, one empty wavelength slot, and the wavelength slot 2025 having two wavelength slots are consecutively arranged.

Empty wavelength slots are disposed at the respective boundaries of the wavelength region 2001, the wavelength region 2002, and the wavelength region 2003 to prevent the influence of the interference between the wavelength slots. More specifically, one empty wavelength slot is disposed on the long-wavelength side (the right side in the figure) of the wavelength region 2001 and on the short-wavelength side (the left side in the figure) of the wavelength region 2003, respectively.

In the second exemplary embodiment of the present invention, as is the case with the first exemplary embodiment, the optical network controller 1 grasps wavelength slot allocation information, and empty wavelength slots or the availability of empty wavelength slots, based on a state signal from the optical node 9. The optical path setting unit 5 performs the wavelength defragmentation on each of the first standby system optical path and the second standby system optical path.

More specifically, A representing the number of wavelength slots allocated in the wavelength region for the standby system optical path, and B representing the total number of wavelength slots in the wavelength region for the standby system optical path, the utilization ratio P of the wavelength region for the standby system optical path is defined as P=A/B. Setting a prescribed threshold (Pth), the optical path setting unit 5 determines P with respect to Pth. If the condition of P Pth is satisfied, the optical path setting unit 5 starts the wavelength defragmentation of the wavelength region. Subsequently, the optical path setting unit 5 interchanges the wavelength region for the first standby system optical path and the second standby system optical path. And then the optical path setting unit 5 performs the wavelength defragmentation on a wavelength region on which no wavelength defragmentation has been performed and replaces the interchanged wavelength region on its original location. As mentioned above, the procedure of the wavelength defragmentation is determined in advance. To calculate the utilization ratio P, one or both of the wavelength region 2002 and the wavelength region 2003 may be used. Pth may be a fixed value regardless of the wavelength region or may be changed depending on the wavelength region to be used.

FIG. 8 illustrates wavelength slot allocation in the wavelength regions for the active system optical path, the first standby system optical path, and the second standby system optical path from time t0 to time t4 by the optical path setting unit 5. Referring to FIG. 8, if a prescribed setting status is given at time t0, the wavelength region 2001 for the active system optical path, the wavelength region 2002 for the first standby system optical path, and the wavelength region 2003 for the second standby system optical path at time t0 are the same as those in FIG. 7.

As a first step, it is assumed that P≥Pth is satisfied in the wavelength region 2103 at time t1. The wavelength slots in the wavelength region 2001 (active system optical path) and the wavelength region 2002 (first standby system optical path) are fixed, and the wavelength defragmentation is performed only on the wavelength region 2103 (second standby system optical path). That is to say, the wavelength slots from 2021 to 2025 in the wavelength region 2003 at time t0 are shifted toward shorter wavelengths and disposed so that they may be arranged consecutively. As a result, the wavelength slots from 2121 to 2125 are consecutively allocated from the short wavelength side to the wavelength region 2103. Here, the wavelength defragmentation changes the wavelength slot 2021 into the wavelength slot 2121 and the wavelength slot 2022 into the wavelength slot 2122. The other wavelength slots are associated in the same way. Such wavelength defragmentation makes empty wavelength slots aggregate on the long-wavelength side (the right side in the figure) in the wavelength region 2103 and enables consecutive empty wavelength slots with maximum width to be prepared. That is to say, from time t0 to time t1, the wavelength defragmentation is performed only on the wavelength region for the second standby system optical path, and the wavelength regions for the active system optical path and the first standby system optical path stay unchanged.

As a second step, the wavelength region 2103 having undergone the wavelength defragmentation at time t1 is interchanged with the wavelength region 2002 having not yet undergone the wavelength defragmentation. That is to say, the wavelength regions are interchanged at time t2 so that the wavelength region for the first standby system optical path may change from the wavelength region 2002 to a wavelength region 2203, and the wavelength region for the second standby system optical path may change from the wavelength region 2103 to a wavelength region 2202. From time t1 to time t2, physical elements such as wavelengths are kept unchanged, and only the logical control information is changed that the first standby system optical path is interchanged with the second standby system optical path.

As a third step, at time t3, it is assumed that P≥Pth is satisfied in the wavelength region 2202 for the second standby system optical path. As is the case with the first step, the wavelength slots in the wavelength region 2001 and the wavelength region 2203 are fixed, and the wavelength defragmentation is performed only on the wavelength region 2202 at time t2. That is to say, a wavelength slot 2211 in the wavelength region 2202 at time t2 is fixed, and the wavelength slots 2214, 2215, 2217, and 2219 are shifted toward shorter wavelengths and rearranged so that they may be arranged consecutively. As a result, the wavelength slots 2311, 2314, 2315, 2317, and 2319 are consecutively allocated from the short wavelength side to a wavelength region 2302 at time t3. That is to say, the wavelength defragmentation changes the wavelength slot 2211 into the wavelength slot 2311 and the wavelength slot 2214 into the wavelength slot 2314. The other wavelength slots are associated in the same way. Such wavelength defragmentation makes empty wavelength slots aggregate on the long-wavelength side (the right side in the figure) in the wavelength region 2302 and enables consecutive empty wavelength slots with maximum width to be prepared. In this way, the wavelength defragmentation has been completed at the third step with respect to both the first standby system optical path and the second standby system optical path.

As a fourth step, the wavelength regions interchanged at time t2 are interchanged again. That is to say, the wavelength regions are interchanged at time t4 so that the wavelength region for the first standby system optical path may change from the wavelength region 2203 to a wavelength region 2402, and the wavelength region for the second standby system optical path may change from the wavelength region 2302 to a wavelength region 2403. As is the case with the second step, from time t3 to time t4, physical elements such as wavelengths are kept unchanged, and only the logical control information is changed that the first standby system optical path is interchanged with the second standby system optical path.

There are no differences in physical wavelength band allocation between the wavelength region for the first standby system optical path and the wavelength region for the second standby system optical paths at times t3 and t4, and there is a difference only in the logical control information. Therefore, the fourth step may be omitted if there is no need to manage closely the first standby system and the second standby system.

Figure 9:
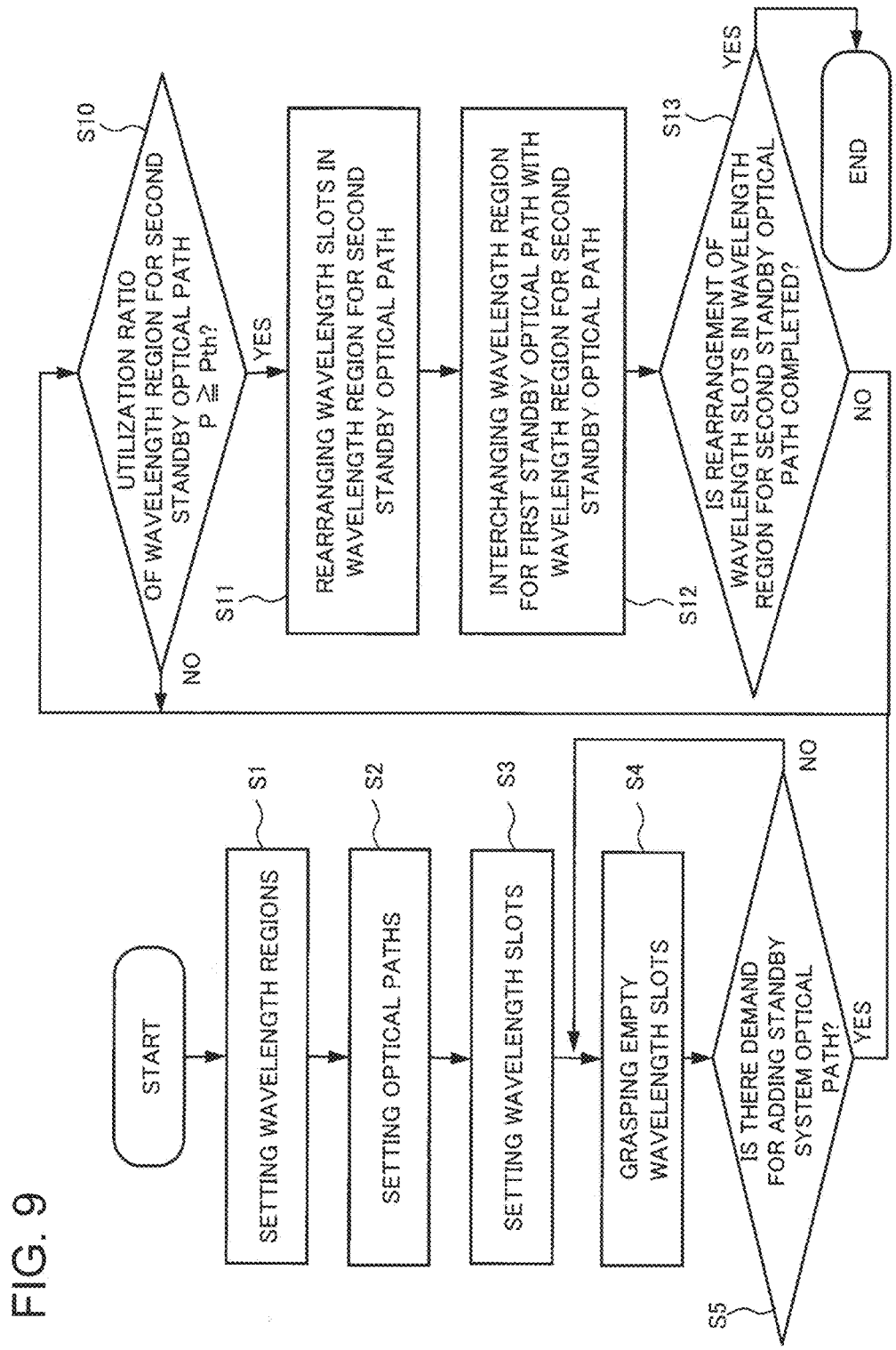
FIG. 9 is a flowchart for explaining processing operations of the optical network controller in accordance with the second exemplary embodiment of the present invention.

Next, processing operations of the optical network controller in accordance with the second exemplary embodiment will be described, and the processing operations are concerned with the setting and rearrangement of optical paths, wavelength regions, and wavelength slots. FIG. 9 is a flowchart illustrating the processing operation of the optical network controller in accordance with the second exemplary embodiment of the present invention. In FIG. 9, the steps S6 and S7 in FIG. 6 are replaced, and steps S1 to S5 are the same as those in FIG. 6.

Referring to FIG. 9, the optical network controller 1 executes steps from S1 to S5. Subsequently, the optical network controller 1 monitors the utilization ratio P of the wavelength region 2103 for the second standby system optical path (step S10). If P<Pth is satisfied (step S10/NO), the optical network controller 1, returning to a position prior to step S10, carries on monitoring the utilization ratio P. If P≥Pth is satisfied in the wavelength region 2003 (step S10/YES), the optical network controller 1 performs the wavelength defragmentation on the wavelength region 2103 for the second standby system optical path (step S11). That is to say, the optical network controller 1 consecutively allocates the wavelength slots from 2121 to 2125 to the wavelength region 2103 from the short wavelength side.

Subsequently, the optical network controller 1 interchanges the wavelength regions so that the wavelength region for the first standby system optical path may change from the wavelength region 2002 to the wavelength region 2203, and the wavelength region for the second standby system optical path may change from the wavelength region 2103 to the wavelength region 2202 (step S12). Following this step, the optical network controller 1 determines whether the wavelength defragmentation of the interchanged wavelength region 2202 for the second standby system optical path has been completed (step S13). If the wavelength defragmentation of the wavelength region 2202 has not been completed (step S13/NO), the optical network controller 1, returning to step S10, monitors the utilization ratio P of the wavelength region 2302 for the second standby system optical path (step S10).

If P<Pth is satisfied in the wavelength region 2302 (step S10/NO), the optical network controller 1, returning to a position prior to step S10, carries on monitoring the utilization ratio P. If P≥Pth is satisfied in the wavelength region 2302 (step S10/YES), the optical network controller 1 performs the wavelength defragmentation on the wavelength region 2302 for the second standby system optical path, and consecutively allocates the wavelength slots 2311, 2314, 2315, 2317, and 2319 to the wavelength region 2302 from the short wavelength side (step S11). Subsequently, the optical network controller 1 interchanges the wavelength regions so that the wavelength region for the first standby system optical path may change from the wavelength region 2203 to the wavelength region 2402, and the wavelength region for the second standby system optical path may change from the wavelength region 2302 to the wavelength region 2403 (step S12). Subsequently, the optical network controller 1 executes the step S13 again. Since the wavelength defragmentation of the wavelength region 2403 for the second standby system optical path has already been completed (step S13/YES), the flow is finished.

In order to determine whether the wavelength defragmentation of the second standby system optical path has been completed, it may be monitored whether empty wavelength slots are consecutively arranged on the long-wavelength side of the relevant wavelength region. Alternatively, a flag may be set every time the wavelength defragmentation for the second standby system optical path is performed, and the number of flags may be monitored. In this case, a completion value of the wavelength defragmentation for the second standby system optical path is defined depending on the number of standby system optical paths, and it is determined that the wavelength defragmentation has been completed when the number of the flags has become equal to or larger than the value.

As is the case with the first exemplary embodiment of the present invention, steps from S1 to S4 composes a flow for the first setting, and steps from S5 to S13 composes a flow for the second setting which is added to the first setting. The optical network controller 1 transmits to the optical node A the instruction signal including the information on the setting of optical paths and wavelength regions, and the rearrangement of wavelength slots, every time the first setting is performed or the wavelength defragmentation is performed on the wavelength region for the second standby system optical path in the second setting. The optical wavelength region setting unit 4, the optical path setting unit 5, and the controller 6, which compose the optical network controller 1, execute the respective steps in the above-mentioned flowchart sharing the steps appropriately.

As described above, without the wavelength defragmentation for the active system optical path, the number of consecutive empty wavelength slots in the wavelength region for the first standby system optical path increases from two slots to four slots. Similarly, the number of consecutive empty wavelength slots in the wavelength region for the second standby system optical path increases from one slot to four slots. That is to say, it is possible to achieve the stable operation in which signals are transmitted without instantaneous interruption through the active system optical path providing communication services, and to improve the wavelength-band utilization rate of the standby system optical path for a double failure.

The procedure of the wavelength defragmentation such as steps from the first step to the fourth step is determined in advance. This makes it possible to eliminate the need for a step to develop a procedure for the wavelength defragmentation which needs to be done prior to performing the wavelength defragmentation, a time to control the procedure, and a device or a control circuit necessary for developing the procedure. If it is made unnecessary to develop the above-described procedure, it is possible to carry out the wavelength defragmentation for the standby system optical path swiftly.

The wavelength defragmentation according to the second exemplary embodiment is carried out when a wavelength region is allocated to the second standby system optical path. This ensures the wavelength region of the first standby system optical path on which the wavelength defragmentation is not being performed, for the active system optical path. It becomes possible, therefore, to recover failures even though a failure occurs during the wavelength defragmentation. Although it is described as an example above that the controller 6 transmits the instruction signal to the optical node A, the controller 6 also transmits similar setting and instruction signals to the other optical nodes.

In the second exemplary embodiment, the wavelength defragmentation for the second standby system optical path is performed with remaining the wavelength slots for the first standby system optical path, but the wavelength defragmentation is not limited to this. The wavelength defragmentation for the first standby system optical path may be performed with remaining the wavelength slots for the second standby system optical path. In this case, before the wavelength defragmentation for the first standby system optical path is performed, the optical network controller 1 sets the fact that a failure has occurred in the first standby system optical path. This makes it possible to recover the failure by means of the second standby system optical path even though a failure occurs in the active system optical path.

A Third Exemplary Embodiment

Next, a third exemplary embodiment of the present invention will be described in detail. An optical network controller in the third exemplary embodiment has the same configuration as that in the first exemplary embodiment and has a different processing operation for allocating wavelength slots. That is to say, the third exemplary embodiment has a different processing operation for allocating wavelength slots for a new optical path.

Figure 10:
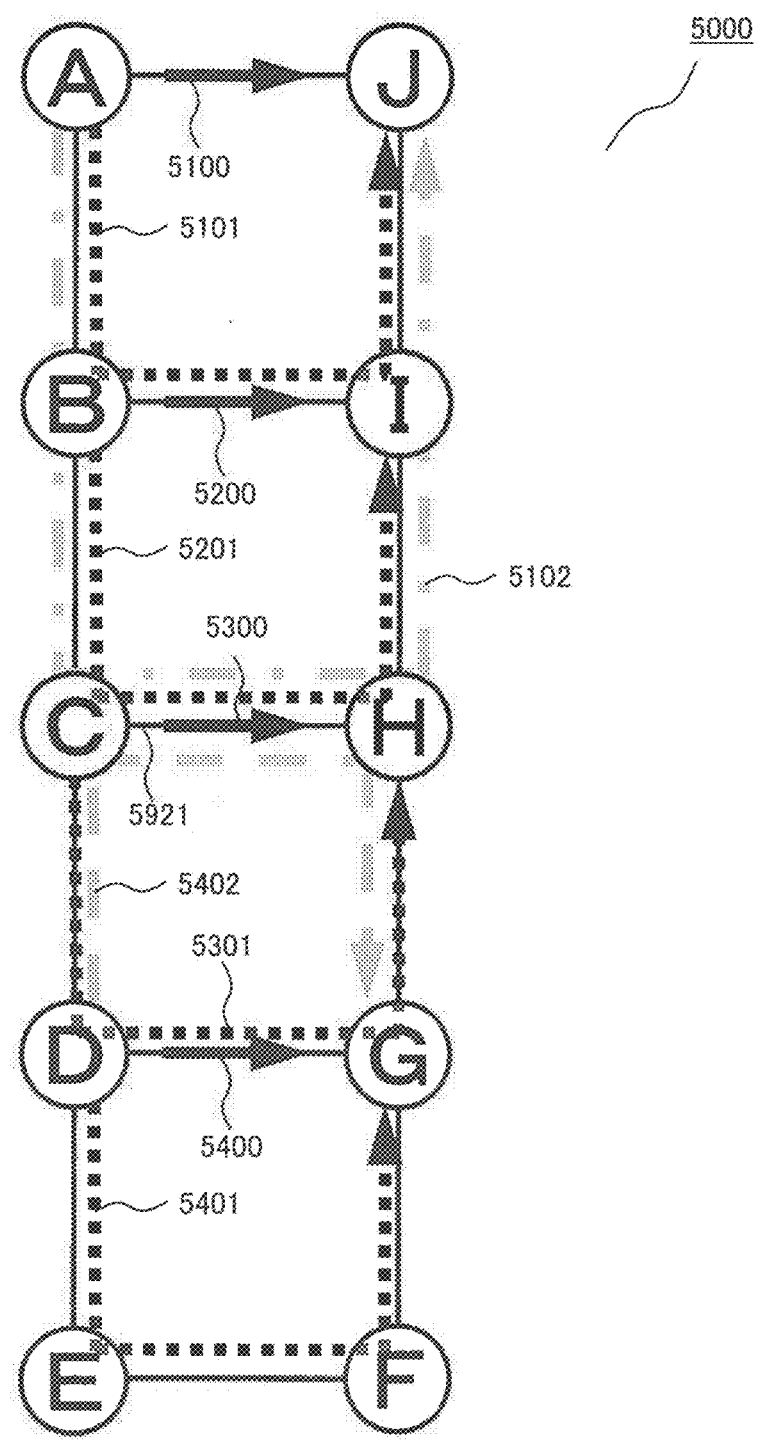
FIG. 10 is a schematic diagram illustrating a configuration of an optical network in accordance with a third exemplary embodiment of the present invention.
Figure 11:
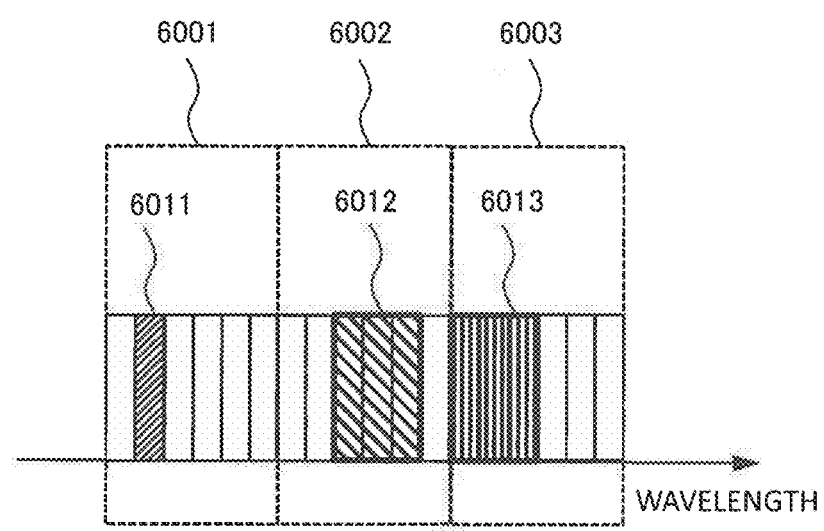
FIG. 11 is a conceptual diagram for explaining a setting status of processing operations of an optical network controller in accordance with the third exemplary embodiment of the present invention.

FIG. 10 is a conceptual diagram illustrating an optical network in accordance with the third exemplary embodiment of the present invention, and illustrates a setting of first and second standby system optical paths for an active system optical path in an optical network in which ten nodes of optical nodes from A to J are connected to each other in a grid pattern through optical fibers. FIG. 11 is a conceptual diagram for explaining a setting status of optical nodes in accordance with the third exemplary embodiment of the present invention, and illustrates the allocation of wavelength slots applied to an optical path through an optical fiber 5921 from optical node C in FIG. 10. With reference to FIG. 10 and FIG. 11, the processing operation of optical nodes in accordance with the third exemplary embodiment of the present invention will be described below.

Referring to FIG. 10, the optical path setting unit 5 sets four optical paths applied to the active system of active system optical paths 5100, 5200, 5300, and 5400, and respective optical paths are applied to optical fibers connected from optical node A to optical node J, from optical node B to optical node I, from optical node C to optical node H, and from optical node D to optical node G. The optical path setting unit 5 sets a first standby system and a second standby system optical paths for these active system optical paths.

In an optical network 5000, the optical path setting unit 5 sets one wavelength slot per hop. Here, a hop number means the number of optical nodes through which to be routed until reaching a communications partner in a network. For example, if optical node A is directly connected to optical node J, one hop is required because of being routed through only one optical node. In this case, the number of wavelength slots that the optical path setting unit 5 sets becomes equal to "one". If optical node A is connected to optical node J through optical nodes B and I, three hops are required because of being routed through three optical nodes. In this case, the optical path setting unit 5 sets "three" wavelength slots. Similarly, if optical node A is connected to optical node J through optical nodes B, C, H, and I, five hops are required; and therefore, the optical path setting unit 5 sets five wavelength slots. All the active system optical paths 5100, 5200, 5300, and 5400 are connected by one hop of a minimum, that is, by one wavelength slot.

For these active system optical paths, first of all, the optical path setting unit 5 sets wavelength slots so that a first standby system optical path may connect prescribed optical nodes by a minimum hop number through a route different from the route for the active system optical path. After allocating first standby system optical paths to all active system optical paths, a second standby system optical path is connected between prescribed optical nodes by a minimum hop number through a route different from the routes for the active system optical path and the first standby system optical path. Conforming to such setting conditions, the relation of Active system optical path<First standby system optical path< Second standby system optical path is satisfied with respect to the hop number in the optical network 5000.

More specifically, the active system optical path 5100 directly connecting optical node A to optical node J is composed of one hop (one wavelength slot). The first standby system optical path is a route connecting optical node A to optical node J through optical nodes B and I, and a first standby system optical path 5101 relevant to that is composed of three hops (three wavelength slots). The second standby system optical path is a route connecting optical node A to optical node J through optical nodes B, C, H, and I, and a second standby system optical path 5102 relevant to that is composed of five hops (five wavelength slots). In this way, the optical path setting unit 5 sets wavelength slots for each optical path. All the basic setting conditions of the first and second standby system optical paths for the four active system optical paths are the same.

In the third exemplary embodiment, in allocating wavelength slots for a new optical path to empty wavelength slots, the optical path setting unit 5 sets the allocation of the wavelength slot in order of priority of the optical path.

Referring to FIG. 11, the optical wavelength region setting unit 4 consecutively sets a wavelength region 6001 for the active system optical path, a wavelength region 6002 for the first standby system optical path, and a wavelength region 6003 for the second active system optical path, which are divided mutually. The optical path setting unit 5 sets the active system optical path 5300 in the wavelength region 6001, and a first standby system optical path 5201 for the active system optical path 5200 in the wavelength region 6002. The optical path setting unit 5 further sets a wavelength slot 6011 with one slot in the wavelength region 6001 for the active system optical path 5300, and a wavelength slot 6012 with three slots in the wavelength region 6002 for the first standby system optical path 5201.

Here, the optical path setting unit 5 performs the setting in order of priority in the wavelength region 6003 for the second standby system optical path. The number of hops that can be taken by the second standby system optical path passing through the optical fiber 5921, may be three hops or five hops. More specifically, the three hops can be taken by a second standby system optical path 5402 for the active system optical path 5400 and a first standby system optical path 5401 relevant to it. The five hops can be taken by the second standby system optical path 5102 for the active system optical path 5100 and the first standby system optical path 5101 relevant to it. Six slots are prepared as wavelength slots for the second standby system applied to the communication from optical node C. Therefore, the wavelength slots are lacking to be simultaneously allocated to the second standby system optical path 5102 requiring five slots and to the second standby system optical path 5402 requiring three slots.

Here, it is determined whether the second standby system optical path 5102 or 5402 is set by setting the priority for the active system optical paths 5100 and 5400 corresponding to the second standby system optical paths 5102 and 5402. For example, the optical path setting unit 5 sets higher priority for the active system optical path 5400 than that for the active system optical path 5100. In this case, the optical path setting unit 5 allocates a wavelength slot 6013 with three slots to the second standby system optical path 5402. This makes it possible to deal with a double failure in the active system optical path 5400 and to make the active system optical path 5200 tolerate a single failure.

The optical path setting unit 5 sets higher priority for the active system optical path 5100 than that for the active system optical path 5400. In this case, the optical path setting unit 5 allocates five slots (not illustrated) out of six slots in the wavelength region 6003 to the second standby system optical path 5102. This makes it possible to deal with a double failure in the active system optical path 5100 and to make the active system optical path 5200 tolerate a single failure. In this manner, the slots in the wavelength region 6003 are efficiently utilized. The above-mentioned priority is set based on various communication conditions such as frequency in use of the active system optical path, and the importance or the urgency of communication services.

As described above, when a new second standby system optical path is set, it is possible to allocate wavelength slots to the wavelength region for the second standby system optical path in order of priority of the corresponding active system optical path. In this case, there is no need to perform the wavelength defragmentation for the active system optical path and the first standby system optical path. That is to say, it is possible to transmit signals without instantaneous interruption through the active system optical path providing communication services, and perform the wavelength defragmentation for the standby system optical path for a double failure in order of priority in use of a plurality of active system optical paths with remaining the first standby system optical path for a single failure to ensure reliability. It is achieved to perform a rapid wavelength defragmentation on the entire network in order of priority in use of active system optical paths.

Although it has been described in the above-mentioned exemplary embodiments to perform the wavelength defragmentation selectively when a standby system optical path is added, the present invention is not limited to this. If a prescribed standby system optical path is eliminated, the wavelength defragmentation may be performed so as to allocate remaining wavelength slots to the empty wavelength slots that is formed due to the elimination.

Although the wavelength defragmentation in the above-described exemplary embodiments includes shifting wavelength slots set already toward shorter wavelengths of the wavelength region and rearranging wavelength slots so as to dispose consecutive wavelength slots on the long-wavelength side of the wavelength region, the present invention is not limited to this. The wavelength defragmentation may include shifting wavelength slots set already toward longer wavelengths of the wavelength region and rearranging wavelength slots so as to dispose consecutive wavelength slots on the short wavelength side of the wavelength region. Alternatively, the wavelength defragmentation may include shifting separately wavelength slots set already to both ends of the wavelength region and rearranging wavelength slots so as to dispose consecutive wavelength slots at the center of the wavelength region. Additionally, the above-mentioned types of rearrangement may be combined.

The above-described exemplary embodiments do not depend on the scale and topology of the network. This makes it possible to apply the selective wavelength defragmentation illustrated in the above-described exemplary embodiments even though the number of nodes, the number of optical paths, or the number of slots in a wavelength band increases.

Although the wavelength region for the standby system optical path is disposed adjacent to the long-wavelength side of the wavelength region for the active system optical path in the above-described exemplary embodiments, the present invention is not limited to this. The wavelength region for the active system optical path may be disposed on the long-wavelength side of the wavelength region for the standby system optical path. Similarly, the wavelength region for the first standby system optical path may be disposed adjacent to the long-wavelength side of the wavelength region for the second standby system optical path. The order may be interchanged in which to arrange the wavelength region for the active system optical path, the wavelength region for the first standby system optical path, and the wavelength region for the second standby system optical path. That is to say, any order will do, such as the order corresponding to wavelength regions for the first standby system optical path, the second standby system optical path, and the active system optical path, and the order corresponding to wavelength regions for the first standby system optical path, the active system optical path, and the second standby system optical path, from the shorter wavelength side. Note, however, that at least one empty wavelength slot is always provided at the boundary between the wavelength region for the active system optical path and the standby system optical path.

The present invention has been described by taking the exemplary embodiments described above as model examples. However, the present invention is not limited to the aforementioned exemplary embodiments. That is to say, the present invention can be implemented in various modes that are apparent to those skilled in the art within the scope of the present invention.

This application is based upon and claims the benefit of priority from Japanese Patent Application No. 2014-034035, filed on Feb. 25, 2014, the disclosure of which is incorporated herein in its entirety by reference.

REFERENCE SIGNS LIST 1 optical network controller
4 optical wavelength region setting unit
5 optical path setting unit
6 controller
10 optical transmitter
11 monitor
12 switching unit
900 optical node ring network
911, 912, 913, 914 optical fiber
921, 923, 925, 928 active system optical path
922, 924, 926, 927, 929 standby system optical path
1000, 1100 wavelength slot allocation
1001, 1002, 1003, 1004 wavelength slot
1101, 1102, 1103, 1104, 1105 wavelength slot
1110, 1120 wavelength region
2001, 2002, 2003 wavelength region
2011, 2012, 2013, 2014, 2015 wavelength slot
2016, 2017, 2018, 2019, 2020 wavelength slot
2021, 2022, 2023, 2024, 2025 wavelength slot
2121, 2122, 2123, 2124, 2125 wavelength slot
2211, 2214, 2215, 2217, 2219 wavelength slot
2221, 2222, 2223, 2224, 2225 wavelength slot
2311, 2314, 2315, 2317, 2319 wavelength slot
5000 optical network
5100, 5200, 5300, 5400 active system optical path
5101, 5201, 5301, 5401 first standby system optical path
5102, 5402 second standby system optical path
6001, 6002, 6003 wavelength region

What is claimed is:

1. An optical network controller, comprising:
a computer-readable memory storing program instructions;
at least one processor configured to execute the program instructions stored in the memory to implement:
an optical wavelength region setting unit configured to set a wavelength region in an optical transmission line between a plurality of optical nodes composing an optical network using wavelength division multiplexing system dividing the wavelength region into consecutive regions of a first wavelength region and a second wavelength region;
an optical path setting unit configured to set a first optical path in the first wavelength region and a second optical path in the second wavelength region, the second optical path differing from the first optical path in a route; and
a controller configured to instruct the plurality of optical nodes on a central wavelength and a usable band of signal light for the optical node to transmit based on a setting by the optical path setting unit, wherein the controller instructs the plurality of optical nodes to change the central wavelength and the usable band so as to rearrange the second optical path in the second wavelength region, keeping a placement of the first optical path in the first wavelength region constant.

2. An optical network controller, comprising:
a computer-readable memory storing program instructions;
at least one processor configured to execute the program instructions stored in the memory to implement:
an optical wavelength region setting unit configured to set a wavelength region in an optical transmission line between a plurality of optical nodes composing an optical network using wavelength division multiplexing system dividing the wavelength region into consecutive regions of a first wavelength region and a second wavelength region;
an optical path setting unit configured to set a first optical path in the first wavelength region and a second optical path in the second wavelength region, the second optical path differing from the first optical path in a route; and
a controller configured to instruct the plurality of optical nodes on a central wavelength and a usable band of signal light for the optical node to transmit based on a setting by the optical path setting unit, wherein
the optical wavelength region setting unit sets a consecutive region of a third wavelength region in one of the first wavelength region and the second wavelength region,
the optical path setting unit sets a third optical path in the third wavelength region, the third optical path differs from the first optical path and the second optical path in a route, and
the controller instructs the plurality of optical nodes to change the central wavelength and the usable band so as to rearrange the third optical path in the third wavelength region, keeping a placement of the first optical path in the first wavelength region constant.

3. The optical network controller according to claim 2, wherein
the optical path setting unit interchanges a placement of the third optical path in the third wavelength region with a placement of the second optical path in the second wavelength region, and
the controller instructs the plurality of optical nodes to change the central wavelength and the usable band so as to rearrange a placement of the second optical path in the second wavelength region.

4. The optical network controller according to claim 3, wherein the third optical path is consecutively set from an end of one of the second wavelength region and the third wavelength region.

5. The optical network controller according to claim 3, wherein the controller instructs the plurality of optical nodes to change the central wavelength and the usable band when a usable bandwidth allocated to one of the second wavelength region and the third wavelength region exceeds a prescribed value.

6. The optical network controller according to claim 3, wherein
the second optical path is a route of the first optical path for a single failure, and
the third optical path is a route of the first optical path for a double failure.

7. The optical network controller according to claim 6, wherein the third optical path is consecutively set from an end of one of the second wavelength region and the third wavelength region.

8. The optical network controller according to claim 6, wherein the controller instructs the plurality of optical nodes to change the central wavelength and the usable band when a usable bandwidth allocated to one of the second wavelength region and the third wavelength region exceeds a prescribed value.

9. The optical network controller according to claim 6, wherein the controller instructs the plurality of optical nodes to set the central wavelength and the usable band at a location other than boundaries of the first wavelength region, the second wavelength region, and the third wavelength region.

10. The optical network controller according to claim 6, wherein,
with the first optical path including a plurality of first active optical paths, the optical path setting unit sets priority for the plurality of first active optical paths, and
the controller instructs the plurality of optical nodes to change the central wavelength and the usable band so as to dispose the third optical path in the third wavelength region based on the priority of the plurality of first active optical paths.

11. The optical network controller according to claim 10, wherein the third optical path is consecutively set from an end of one of the second wavelength region and the third wavelength region.

12. The optical network controller according to claim 10, wherein the controller instructs the plurality of optical nodes to change the central wavelength and the usable band when a usable bandwidth allocated to one of the second wavelength region and the third wavelength region exceeds a prescribed value.

13. The optical network controller according to claim 3, wherein the controller instructs the plurality of optical nodes to set the central wavelength and the usable band at a location other than boundaries of the first wavelength region, the second wavelength region, and the third wavelength region.

14. The optical network controller according to claim 2, wherein the third optical path is consecutively set from an end of one of the second wavelength region and the third wavelength region.

15. The optical network controller according to claim 14, wherein the controller instructs the plurality of optical nodes to change the central wavelength and the usable band when a usable bandwidth allocated to one of the second wavelength region and the third wavelength region exceeds a prescribed value.

16. The optical network controller according to claim 2, wherein the controller instructs the plurality of optical nodes to change the central wavelength and the usable band when a usable bandwidth allocated to one of the second wavelength region and the third wavelength region exceeds a prescribed value.

17. The optical network controller according to claim 2, wherein the controller instructs the plurality of optical nodes to set the central wavelength and the usable band at a location other than boundaries of the first wavelength region, the second wavelength region, and the third wavelength region.

* * * * *